(12) United States Patent
Fujimori

(10) Patent No.: US 7,270,336 B2
(45) Date of Patent: Sep. 18, 2007

(54) ADJUSTABLE STABILIZER BAR ASSEMBLY

(76) Inventor: Hiromichi Fujimori, 12 Brigmore Aisle, Irvine, CA (US) 92603

( * ) Notice: Subject to any disclaimer, the term of this patent is extended or adjusted under 35 U.S.C. 154(b) by 357 days.

(21) Appl. No.: 10/988,209

(22) Filed: Nov. 12, 2004

(65) Prior Publication Data

US 2005/0110228 A1   May 26, 2005

Related U.S. Application Data

(60) Provisional application No. 60/519,315, filed on Nov. 12, 2003.

(51) Int. Cl.
*B60G 17/15* (2006.01)
(52) U.S. Cl. ............... 280/5.511; 267/277; 280/124.106
(58) Field of Classification Search ............ 280/5.506, 280/5.507, 5.511, 124.106, 124.149, 124.152, 280/124.166, 684; 267/188, 273, 277
See application file for complete search history.

(56) References Cited

U.S. PATENT DOCUMENTS

| | | | | |
|---|---|---|---|---|
| 4,648,620 A | * | 3/1987 | Nuss ...................... | 280/5.511 |
| 4,962,943 A | * | 10/1990 | Lin ......................... | 280/5.511 |
| 5,934,696 A | * | 8/1999 | Bloser et al. ......... | 280/124.106 |
| 6,513,819 B1 | * | 2/2003 | Oliver et al. ......... | 280/124.152 |
| 6,637,757 B2 | * | 10/2003 | Ignatius et al. .......... | 280/5.511 |
| 6,698,767 B2 | * | 3/2004 | Hagan ..................... | 280/5.511 |
| 2005/0179219 A1 | * | 8/2005 | Barron ..................... | 280/5.506 |

\* cited by examiner

*Primary Examiner*—Paul N. Dickson
*Assistant Examiner*—Leonard McCreary, Jr.

(57) ABSTRACT

An adjustable stabilizer bar assembly is disclosed. An adjustable stabilizer bar assembly includes a cylindrical housing, a first primary half bar, a splined cylindrical housing, a second primary half bar, a splined torsion bar and a slidable assembly. The primary and secondary half bars are mounted to a vehicle suspension via the cylindrical housings. The splined torsion bar is disposed between the two cylindrical housings. The assembly allows for adjustable multi-rate stabilization means made by either the driver or an automatic control system, which may sense vehicle velocity, lateral acceleration or any other suitable operating variable.

9 Claims, 2 Drawing Sheets

ADJUSTABLE STABILIZER BAR ASSEMBLY

This Application claims priority to U.S. Provisional Patent Application 60/519,315 filed on Nov. 12, 2003.

FIELD OF THE INVENTION

The present invention relates to torsion bars, and in particular to an adjustable stabilizer bar assembly.

BACKGROUND OF THE INVENTION

The use of torsional stabilizer bars is well known in the automotive industry. Stabilizer bars commonly include a transverse torsional segment pivotally attached to a vehicular chassis and leading or trailing longitudinal segments attached to a control arm or wheel carrier. Generally, the torsional segments are mounted perpendicular to the longitudinal axis of a vehicle between opposite wheel assemblies. During a cornering maneuver, torsional resistance from the stabilizer bar decreases roll or lean of the vehicular body.

A slide assembly changes the length of the uncovered secondary transverse torsional segment of the stabilizer bar. The torsional moment of the secondary transverse torsional segment changes by the amount of the length of uncovered secondary transverse torsional segment of the stabilizer bar, thereby providing adjustable roll resistance.

U.S. Pat. No. 4,597,568 is directed to an adjustable torsion bar assembly that includes a torsion bar frame having upstanding legs and a structural frame for holding a tip-up bed. A pair of torsion rods extend between a frame leg and a structural frame side. A lead screw having threaded portions threaded in opposed helices extends between the structural frame sides which upon rotation moves a pair of pivot plates either inwardly or outwardly in unison. Each pivot plate includes a torsion rod-confining aperture in sliding engagement with a portion of a torsion span of rods as rotation of the lead screw adjusts the movement of the pivot plates along the rods changing the effective span of the torsion rods. The adjusting feature thus allows varying but equal degrees of stored energy in each of the torsion rods when they are twisted resultant from vertical to horizontal movement of the structural frame with respect to the torsion bar frame, the latter of which is fixed with respect to a support floor or wall.

U.S. Pat. No. 6,520,510 is directed to a vehicle roll control system has a torsion bar and a first arm extending substantially perpendicular to the torsion bar. The first arm is fixed to the torsion bar at one end and connectable to one of the axles at the other end. A hydraulic actuator is attached to the torsion bar; and a control connected to the hydraulic actuator controls the operation thereof on detection of a predetermined vehicle condition. The hydraulic actuator comprises a housing, a piston making a sealing sliding fit inside the housing to define a first fluid chamber and a second fluid chamber, and a piston rod connected to the piston and extending through the second fluid chamber and out of the housing. The control acts on detection of the predetermined vehicle condition either to apply substantially the same fluid pressure to the first and second fluid chambers when the piston tends to move in a first direction to extend the hydraulic actuator or to apply a fluid pressure to the second fluid chamber above the fluid pressure in the first fluid chamber when the piston tends to move in a second direction to compress the hydraulic actuator. The first fluid chamber is fluidly connected to a fluid reservoir by the control when the piston tends to move in the second direction, and the control comprises a fluid pump and a directional valve, the pump being fluidly connected to the second fluid chamber and the directional valve being capable of moving between a first position in which the first fluid chamber and the second fluid chamber are fluidly connected, and a second position in which the first fluid chamber is fluidly connected to the fluid reservoir.

U.S. Pat. No. 6,276,693 discloses a roll control system for installation between axially aligned wheels of a motor vehicle, the roll control system comprising a torsion bar; a first hydraulic actuator attached to one end of the torsion bar and attachable to one of the wheels; a second hydraulic actuator attached to the other end of the torsion bar and attachable to the other wheel; and an electronic control unit monitoring one or more predetermined vehicle operating conditions; wherein the first and second hydraulic actuators are substantially identical, each comprising a compression chamber containing hydraulic fluid, a rebound chamber containing hydraulic fluid, a movable piston between and fluidly isolating the compression chamber and the rebound chamber, a piston rod connected to the piston and extending through the rebound chamber, a gas chamber containing pressurised gas acting on the hydraulic fluid in the rebound chamber, and an electrically operated valve between the compression chamber and the rebound chamber and actuated by the control unit dependent on the monitored conditions, the valve being actuable between a two-way position in which the valve allows hydraulic fluid to flow between the compression chamber and the rebound chamber and a one-way position in which the valve allows hydraulic fluid to flow from the rebound chamber into the compression chamber but not from the compression chamber into the rebound chamber. Reduces the risk of incorrect latching of the torsion bar.

U.S. Pat. No. 6,299,091 is directed to a seat belt retractor spool has a spool body with opposed end flanges. A ratchet wheel is arranged on one end flange. A torsion bar is located in a bore in the spool body and is coupled to the ratchet wheel by means of a toothed portion at one end thereof. The other end of the torsion bar has a plurality of radial projections which cooperate with axial protrusions on the end flange to couple the bar to the spool.

U.S. Pat. No. 4,098,357 discloses a torsion bar suspension system for a seat. Structure is provided for twisting the torsion bar to preload it. Structure is also provided for adjusting the height of the seat without changing the preload in the torsion bar, and this is accomplished by pivoting the preloading structure, with the torsion bar, about the axis of the torsion bar.

U.K. Patent Application No. 2,284,184 is directed to a vehicle roll control system for a vehicle having a pair of wheels each rotatable on an axle, comprising a torsion bar; a first arm extending substantially perpendicular to the torsion bar, the first arm being fixed to the torsion bar at one end and being connectable to one of the axles at the other end; a second arm extending substantially perpendicular to the torsion bar, the second arm being rotatably mounted on the torsion bar at one end and being connectable to the other axle at the other end; and rotation control means connected between the second arm and the torsion bar, the rotation control means being actuable on detection of a predetermined vehicle condition to substantially prevent or allow rotation of the second arm relative to the torsion bar.

There is a need, however, for an adjustable multi-rate stabilization means, which is not disclosed in any of the above references. The rate selection may be made by either the driver or automatic control system, which may sense vehicle velocity, lateral acceleration or any other suitable operating variable.

OBJECTS AND SUMMARY OF THE INVENTION

It is a first object of the present invention to provide an adjustable stabilizer bar assembly.

It is yet another object of the present invention to provide an adjustable stabilizer bar assembly having a cylindrical housing; a first primary half bar, having an inner end and an outer end, wherein the inner end of the first primary half bar is mounted to the cylindrical housing and the outer end of the first primary half bar is mounted to a vehicle suspension; a splined cylindrical housing; a second primary half bar, having an inner end and an outer end, wherein the inner end of the second primary half bar is mounted to the splined cylindrical housing and the outer end of the second primary half bar is mounted to the vehicle suspension; a splined torsion bar, adjustably disposed between the cylindrical housing and the splined cylindrical housing; and a slidable assembly, disposed about the second primary half bar, wherein the slidable assembly can slide back and forth along the second primary half bar to uncover a portion of the splined torsion bar.

In accordance with a first aspect of the present invention, a novel adjustable stabilizer bar assembly is provided. The novel adjustable stabilizer bar includes a cylindrical housing; a first primary half bar, having an inner end and an outer end, wherein the inner end of the first primary half bar is mounted to the cylindrical housing and the outer end of the first primary half bar is mounted to a vehicle suspension; a splined cylindrical housing; a second primary half bar, having an inner end and an outer end, wherein the inner end of the second primary half bar is mounted to the splined cylindrical housing and the outer end of the second primary half bar is mounted to the vehicle suspension; a splined torsion bar, adjustably disposed between the cylindrical housing and the splined cylindrical housing; and a slidable assembly, disposed about the second primary half bar, wherein the slidable assembly can slide back and forth along the second primary half bar to uncover a portion of the splined torsion bar.

In accordance with a second aspect of the present invention, a novel adjustable stabilizer bar having a slidable ring and slidable sleeve to adjust the coverage of a torsion bar is provided. The novel adjustable stabilizer bar includes includes a cylindrical housing; a first primary half bar, having an inner end and an outer end, wherein the inner end of the first primary half bar is mounted to the cylindrical housing and the outer end of the first primary half bar is mounted to a vehicle suspension; a splined cylindrical housing; a second primary half bar, having an inner end and an outer end, wherein the inner end of the second primary half bar is mounted to the splined cylindrical housing and the outer end of the second primary half bar is mounted to the vehicle suspension; a splined torsion bar, adjustably disposed between the cylindrical housing and the splined cylindrical housing; and a slidable assembly, disposed about the second primary half bar, wherein the slidable assembly can slide back and forth along the second primary half bar to uncover a portion of the splined torsion bar. The slidable assembly comprises a slidable sleeve and a slidable ring.

BRIEF DESCRIPTION OF THE DRAWINGS

The foregoing summary, as well as the following detailed description of a preferred embodiment of the present invention will be better understood when read with reference to the appended drawings, wherein.

DETAILED DESCRIPTION OF THE PREFERRED EMBODIMENT

Figure 1:
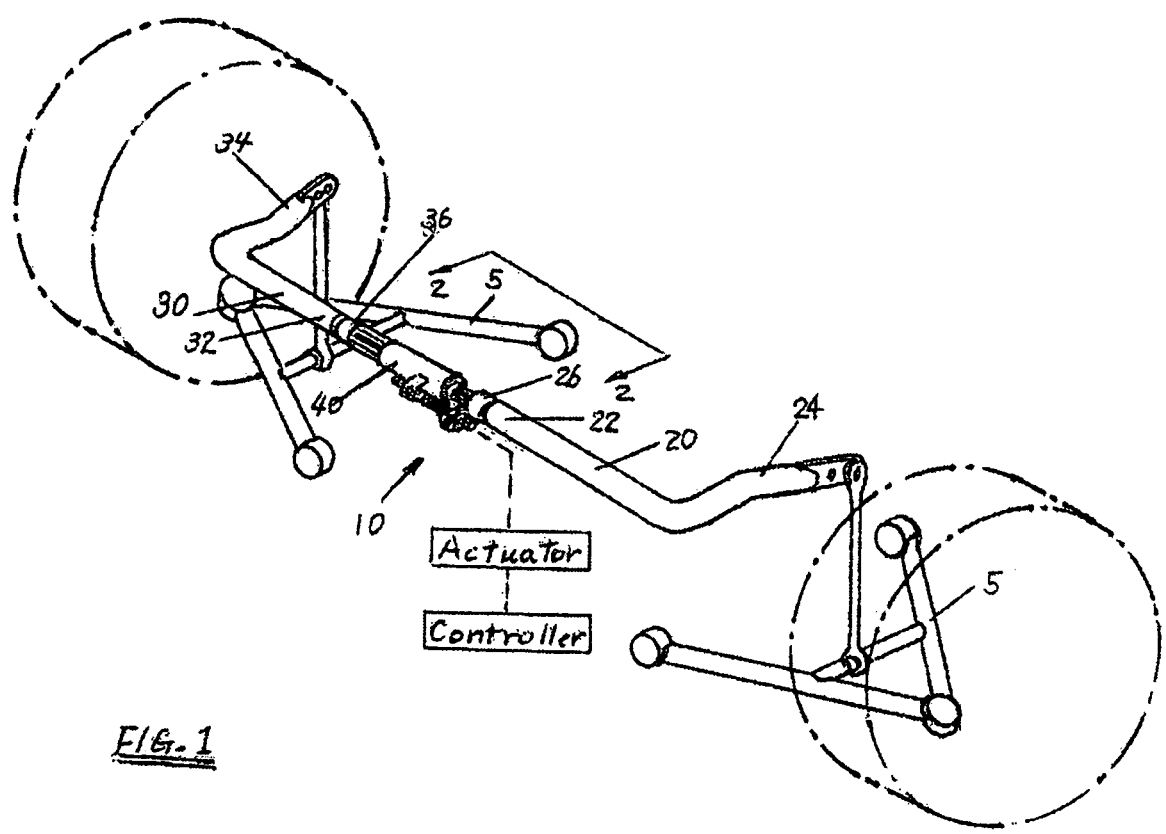
FIG. 1 is a perspective view of a slide assembly for an adjustable stabilizer bar shown mounted on a vehicle axle, in accordance with the present invention.
Figure 2:
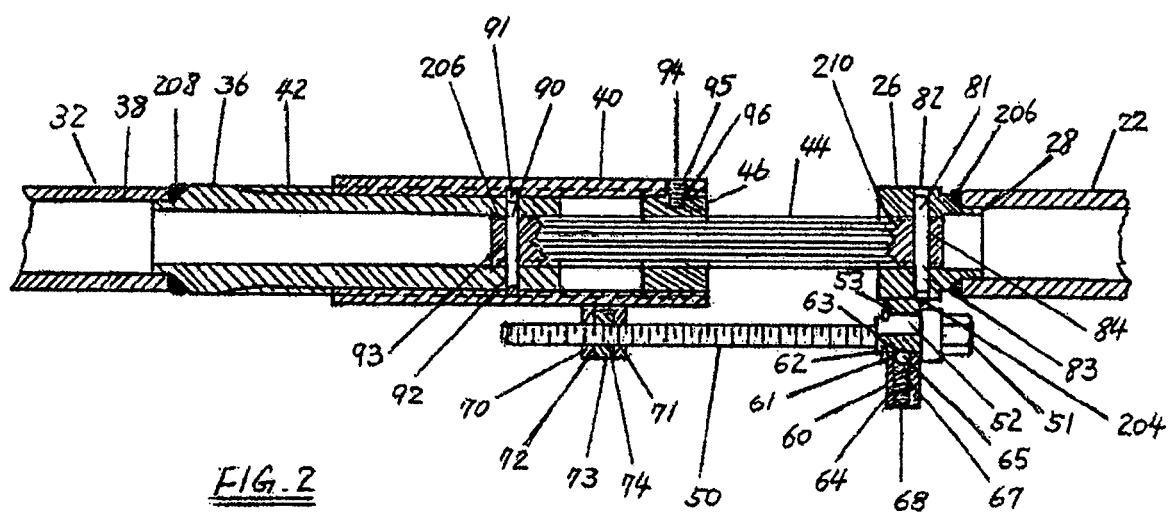
FIG. 2 is a partial cross sectional view of the slide assembly for an adjustable stabilizer bar as depicted in FIG. 1 along the line 2-2.

Referring now to the drawings, wherein like reference numerals refer to the same components across the several views and in particular to FIGS. 1 and 2, there is shown an adjustable stabilizer bar assembly 10.

A first primary half bar 20 includes an inner end 22, which is mounted on a cylindrical housing 26 and an outer end 24. A second primary half bar 30 includes an inner end 32, which is mounted on a splined cylindrical housing 36 and an outer end 34. The outer ends 24 and 34 are mounted in any desired manner to vehicular suspension components (e.g., opposite control arms 5) so that the stabilizer bar assembly 10 is transversely mounted to the longitudinal axis of a vehicle in a well known manner.

The cylindrical housing 26 is inserted into the left portion of the bore 28, and then fixedly secured to the inner end 22 of the half bar 20. In a preferred embodiment of the present invention, the cylindrical housing 26 is secured to the inner end 22 of the half bar 20 by means of welding as shown at 206, however, any known means to one of ordinary skill in the art may be employed to fixedly secure the cylindrical housing 26 to the inner end 22 of the half bar 20. The splined cylindrical housing 36 is inserted into the right portion of the bore 38, and then fixedly secured to the inner end 32 of the half bar 30, preferably by welding, however any fastening means known to one of ordinary skill in the art may be employed.

The cylindrical housing 26, which is non-rotatably connected, for example, by a splined connection 210 with the secondary splined torsion bar 44 (secondary transverse torsional segment). A dowel pin 81 is pressed through slots 82 and 83 in the cylindrical housing 26, and a slot 84 in the right portion of the secondary splined torsion bar 44 to fix the longitudinal position of the secondary splined torsion bar 44 with respect to the cylindrical housing 26. The splined cylindrical housing 36, which is non-rotatably connected, for example, by a splined connection 206 with the secondary splined torsion bar 44.

A dowel pin 90 is pressed through slots 91 and 92 in the splined cylindrical housing 36, and a slot 93 in the left portion of the secondary splined torsion bar 44 to fix the longitudinal position of the secondary splined torsion bar 44 with respect to the splined cylindrical housing 36.

A slideable ring 46 has a splined outer surface that engages with the splined inner surface of a slideable sleeve 40. A setscrew 94 is threaded through a slot 95 in the sleeve 40 into an opening 96 in the slideable ring 46 to fix the longitudinal position of the slideable ring 46 with respect to the sleeve 40. The slideable ring 46 has a splined inner surface that engages with the splined outer surface of the secondary splined torsion bar 44.

The slideable component, which is composed from the slideable sleeve 40, the slideable ring 46 and a setscrew 94, can be moved backward and forward on the splined periphery 42 in order to change the length of the uncovered segment of the secondary splined torsion bar 44.

A screw rod 50 includes a right portion with a hexagonal section 51 and a circular section 52. The screw rod 50 passes through a bore 53 within the flange 60. The flange 60 is fixedly secured to the cylindrical housing 26 by welding as shown in 204, in a preferred embodiment, however any fastening means known to one of ordinary skill in the art may be utilized. A retaining ring 61 is installed in the groove 62 on the circular portion 52 of the screw rod 50 to fix the longitudinal position of the screw rod 50 with respect to the cylindrical housing 26. A radial bore 64, which is provided within the flange 60 normal to the longitudinal axis of the bore 53, is directed toward a dent 63 on the circular portion 52 of the screw rod 50.

A dent catch ball 65 is movably supported within the bore 64, and is subject to the action of a spring 67. The tension of the spring 67 may be adjusted by a setscrew 68 that is disposed at the outer end of the bore 64.

A flange housing 70 has provided a longitudinal bore 71 and a bore 72 normal to the longitudinal axis of slideable sleeve 40. The flange housing 70 is fixedly secured to the slideable sleeve 40. In a preferred embodiment of the present invention, the flange housing 70 is fixedly secured to the slideable sleeve 40 by silver soldering, however any suitable means known to one of ordinary skill in the art may be employed. A pin 73 includes a threaded slot 74 which is normal to longitudinal axis of the pin 73, and is inserted into the bore 72 in the flange 70. The pin 73 engages the screw rod 50.

In view of the foregoing disclosure, some advantages of the present invention can be seen. For example, a novel stabilizer bar assembly is disclosed. The novel adjustable stabilizer bar assembly allows for manual or automatic control and is slidably adjustable.

While the preferred embodiment of the present invention has been described and illustrated, modifications may be made by one of ordinary skill in the art without departing from the scope and spirit of the invention as defined in the appended claims.

What is claimed is:

1. An adjustable stabilizer bar assembly for a vehicle, comprising:
    a cylindrical housing;
    a first primary half bar, having an inner end and an outer end, wherein said inner end of said first primary half bar is mounted to said cylindrical housing and said outer end of the first primary half bar is mounted to a vehicle suspension;
    a splined cylindrical housing;
    a second primary half bar, having an inner end and an outer end, wherein said inner end of the second primary half bar is mounted to said splined cylindrical housing and said outer end of the second primary half bar is mounted to a vehicle suspension;
    a splined torsion bar, adjustably disposed between the cylindrical housing and said splined cylindrical housing; and
    a slidable assembly, disposed about said splined cylindrical housing, wherein said slidable assembly can slide back an forth along said splined cylindrical housing to uncover a portion of said splined torsion bar.
    said slidable assembly further comprising a slidable ring having a splined outer surface and a slidable sleeve disposed about said second primary half bar, wherein said splined outer surface of said slidable ring engages a splined inner surface of said slidable sleeve;
    a set screw threaded thorough a slot in said slidable sleeve to fix the longitudinal position of said slidable ring along said slidable sleeve;
    said slidable sleeve further comprising a splined inner surface to engage said splined cylindrical housing and said slidable ring;
    a dowel pin, pressed through slots in said cylindrical housing to fix the longitudinal position of said splined torsin bar; and
    a flange mounted to said cylindrical housing and a screw rod, having a right portion with a hexagonal section and a circular section, wherein said screw rod passes through a bore within said flange.

2. The adjustable stabilizer bar assembly of claim 1, wherein the flange is mounted by welding.

3. The adjustable stabilizer bar assembly of claim 1, further comprising a flange housing secured to the slidable sleeve.

4. The adjustable stabilizer bar assembly of claim 3, wherein the screw rod is inserted into a bore in the flange housing.

5. The adjustable stabilizer bar assembly of claim 4, wherein the flange housing further comprises a pin to engage the screw rod to secure the screw rod.

6. The adjustable stabilizer bar assembly of claim 1, further comprising a dent catch ball moveably supported within a bore in the flange, and subject to the action of a spring.

7. The adjustable stabilizer bar assembly of claim 6, further comprising a set screw to adjust the tension of the spring.

8. The adjustable stabilizer bar assembly of claim 1, wherein the adjustment of the adjustable stabilizer bar assembly is manually controlled.

9. The adjustable stabilizer bar assembly of claim 1, wherein the adjustment of the adjustable stabilizer bar assembly is automatically controlled.

* * * * *